(12) United States Patent
Kataoka et al.

(10) Patent No.: US 7,732,561 B2
(45) Date of Patent: Jun. 8, 2010

(54) RANDOM COPOLYMERS OF OXAZOLINE

(75) Inventors: Kazunori Kataoka, Tokyo (JP); Yuichi Yamasaki, Tokyo (JP); Joon-Sik Park, Tokyo (JP)

(73) Assignee: Japan Science and Technology Agency, Saitama (JP)

( * ) Notice: Subject to any disclaimer, the term of this patent is extended or adjusted under 35 U.S.C. 154(b) by 0 days.

(21) Appl. No.: 11/991,282

(22) PCT Filed: Aug. 30, 2006

(86) PCT No.: PCT/JP2006/317587

§ 371 (c)(1),
(2), (4) Date: Feb. 29, 2008

(87) PCT Pub. No.: WO2007/026932

PCT Pub. Date: Mar. 8, 2007

(65) Prior Publication Data
US 2009/0156782 A1    Jun. 18, 2009

(30) Foreign Application Priority Data
Sep. 1, 2005 (JP) ............................. 2005-253977

(51) Int. Cl.
    *C08G 67/02* (2006.01)
(52) U.S. Cl. .................. 528/392; 528/423
(58) Field of Classification Search .......... 528/392
    See application file for complete search history.

(56) References Cited

FOREIGN PATENT DOCUMENTS

| JP | 2-155929 | 6/1990 |
|---|---|---|
| JP | 2-182724 | 7/1990 |
| JP | 4-41600 | 2/1992 |
| JP | 4-128207 | 4/1992 |
| JP | 4-128208 | 4/1992 |
| JP | 05-117390 | * 5/1993 |
| JP | 05-310929 | 11/1993 |
| JP | 8-286313 | * 11/1996 |

OTHER PUBLICATIONS

Uyama, H. et al. *A Novel Thermo-Sensitive Polymer.* Chem Lett., (1992), pp. 1643-1646.
Kataoka, K. et al. *Block copolymer micelles as vehicles for drug delivery,* J. Controlled Release, vol. 24, (1993), pp. 119-132.
Woodle, M. et al. *New Amphipatic Polymer-Lipid Conjugates Forming Long-Circulating Reticuloendothelial System-Evading Liposomes,* Bioconjugate Chem., vol. 5, No. 6, (1994), pp. 493-496.
Park, J. et al. *Versatile Synthesis of End-Functionalized Thermosensitive Poly(2-isoprophl-2-oxazolines),* Macromolecules, vol. 37, (2004), pp. 6786-6792.

* cited by examiner

*Primary Examiner*—Randy Gulakowski
*Assistant Examiner*—Shane Fang
(74) *Attorney, Agent, or Firm*—Wenderoth, Lind & Ponack, L.L.P.

(57) ABSTRACT

The invention provides approximately monodispersible random copolymers obtained from monomeric mixtures of 2-ethyl-2-oxazoline with 2-isopropyl-2-oxazoline, production method thereof and 2-isopropyl-2-oxazoline homopolymer obtained by using special initiator. Such polymers exhibit temperature-responsiveness in an aqueous solution within a broad temperature range, and are useful materials in the technical fields of surface chemistry and biomaterials.

4 Claims, 6 Drawing Sheets

A: After 310 hours

PEtOx$_{25\%}$iPrOx$_{75\%}$

B: After 407 hours

PEtOx$_{50\%}$iPrOx$_{50\%}$

C: After 288 hours

PEtOx$_{75\%}$iPrOx$_{25\%}$

A : PEtOx$_{25\%}$iPrOx$_{75\%}$

B : PEtOx$_{50\%}$iPrOx$_{50\%}$

A

B

RANDOM COPOLYMERS OF OXAZOLINE

TECHNICAL FIELD

This invention relates to random copolymers derived from two kinds of oxazolines. More specifically, the invention relates to monodispersible poly(ethyloxazoline-ran-isopropyloxazoline) whose lower critical solution temperature (LCST) is controlled, and method for preparation thereof.

BACKGROUND ART

It is becoming clear in these years that poly(oxazoline) (hereafter may be abbreviated as POx) are useful materials in the art of surface chemistry and biological materials, because they act as nonionic surfactant, protein modifier, hydrogel and carrier of medicines. Cationic ring-opening polymerization of oxazoline under adequate conditions is known to progress by living polymerization process to provide poly(N-acrylethyleneimine). A wide variety of POx can be produced by changing alkyl substituent or terminal group of starting oxazoline. Those POx's having short chain alkyl (e.g., methyl or ethyl group) at 2-position of side chain are water-soluble. Hydrophilicity of POx, however, decreases with increase in length of the alkyl substituent, until it becomes water-insoluble at all temperatures or at a certain fixed temperature. Of those POx's poly(2-isopropyl-2-oxazoline) (which hereafter may be abbreviated as PiPrOx) having isopropylcarbonyl group at 2-position of side chain are of particular interest. These polymers are soluble in cold water, and their aqueous solutions have their cloud points in the vicinity of physiological conditions (cf. Patent Reference 1 or Non-patent Reference 1 identified below. All References cited in this clause are collectively listed later). This is a property analogous to that of poly(N-isopropylacrylamide) which is a typical temperature-responsive polymer having versatile utilities.

Main merit of PiPrOx which are POx homologs is that they can be strongly expected to be biocompatible temperature-responsive polymers and hence are per se very useful in biomedical utilities. For example, liposomes modified with poly(2-ethyl-2-oxazoline) exhibit high biocompatibility and long blood circulation time (see Non-patent Reference 3) comparable to those of ordinary poly(ethylene glycol) lipopolymer (e.g., see Non-patent Reference 2). Besides, as temperature-responsive PiPrOx which are expected to open up new field of utility, monodispersible heterotelechelic PiPrOx having different functional groups at α-terminal and ω-terminal and the cloud point at about 37° C. have also been provided (cf. Non-patent Reference 4).
(1) Patent Reference 1: JP Hei 5 (1993)-310929A
(2) Non-patent Reference 1: Uyama, H., et al., Chem. Lett., 1992, 1643
(3) Non-patent Reference 2: Kataoka, K., et al., J. Controlled Release, 1993, 24, 119
(4) Non-patent Reference 3: Woodle, I. M., et al., Bioconjugate Chem., 1994, 5, 493
(5) Non-patent Reference 4: Park, J., et al., Macromolecules, 2004, 37, 6786

DISCLOSURE OF THE INVENTION

Although PiPrOx which is described in Patent Reference 1 or Non-patent Reference 1 shows certain temperature-responsive property, it cannot be necessarily regarded as an assembly of polymers which exhibit dispersibility close to monodispersibility. On the other hand, according to Non-patent Reference 4, a polymer which exhibits degree of dispersion (Mw/Mn) worth being called monodispersibility, such as not higher than 1.15 and which, furthermore, shows distinct cloud point slightly variable depending on the polymer concentration in its aqueous solution is offered by selecting mild polymerization reaction conditions, although longer polymerization time is required. However, utility of POx will be further broadened, if the polymer whose temperature-responsive property is so controlled that it will show distinct cloud point or lower critical solution temperature (LCST) at certain temperature within a still wider range could be provided.

We have discovered that different monomers, 2-isopropyl-2-oxazoline and 2-ethyl-2-oxazoline, could form polymers showing distinct cloud point or LCST at certain temperatures over a wide range, without being substantially affected by their blend ratio, in other words, without forming respective whole or partial block segments or the like attributable to the two monomers, even under such mild polymerization reaction conditions as described in Non-patent Reference 4. It is surprising that polymers whose LCST is controlled as above can be provided with use of these polymers, against the anticipation that the progress rates of living polymerization process of 2-isopropyl-2-oxazoline and 2-ethyl-2-oxazoline would be considerably different under mild reaction conditions.

The present invention is completed, based on the above discovery. Accordingly, the invention provides random copolymers represented by the following formula (A):

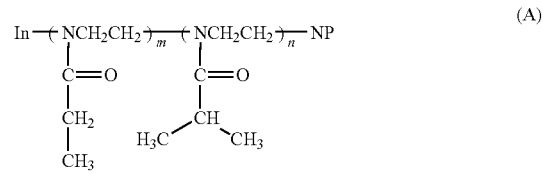

in the formula, In stands for a residue of a cationic polymerization initiator, NP stands for a residue of a nucleophilic agent, and m and n are integers of 5-10,000 independently of each other, m+n being an integer of 10-20,000 and m:n being, in terms of molar ratio, 1:99-99:1.

As another embodiment of the present invention, a method of producing the random copolymer is provided, which comprises a) a step of subjecting a monomeric mixture of 2-ethyl-2-oxazoline with 2-isopropyl-2-oxazoline at a molar ratio of 1:99-99:1 to a ring-opening polymerization in an inert solvent of 30° C.-50° C. in the presence of a cationic polymerization initiator; b) a step of reacting the resulting random copolymer with a nucleophilic agent, and c) where necessary, a step of isolating the formed polymer.

DETAILED DESCRIPTION OF THE INVENTION

The term, random copolymer, as used in the "random copolymers represented by the formula A" signifies the concept commonly accepted in the concerned art.

The straight chain or branched $C_{1-20}$ alkyl which are used for specifying the random copolymers are alkyl groups having 1 to 20 carbon atoms, examples of which include, although not limited thereto, methyl, ethyl, propyl, isopropyl, butyl, t-butyl, sec-butyl, hexyl, octyl, dodecyl, octadecyl, eicosyl and 18-methylnonadecanyl. Similarly, $C_{1-5}$ alkyl and alkyl moieties of $C_{1-20}$ alkoxy and aryl-$C_{1-3}$ alkyl which are used to specify the random copolymers are those alkyl groups as exemplified in the above, each containing the respective number of carbon atoms. "Aryl" in aryloxy means such groups which are formed upon elimination of one hydrogen atom bound to such aromatic hydrocarbon ring as phenyl, tolyl, naphthyl and the like.

The residue derived from cationic polymerization initiator, which specifies In in the formula (A) may be any group, so long as it is a residue of a polymerization initiator capable of providing random copolymers meeting the object of the present invention. Although not in limitative sense, it can be one corresponding to group R where a great variety of tosylates are expressed by a general formula: TsOR, and can be an optionally substituted alkyl group in alkanols or substituted alkanols. It can also be poly(oxazoline) (or poly(N-acylethyleneimine)). While it is unnecessary to limit the number of carbon atoms or degree of branching of the alkyl groups, so long as they have no adverse effect on temperature-responsive property of poly(2-ethyl-2-oxazoline-ran-2-isopropyl-2-oxazoline) segments in the formula (A), consisting of m and n recurring units, respectively, generally they can be $C_{1-20}$ alkyl groups. Preferred alkyl groups are those belonging to the category of so called "lower alkyl groups".

Where they are substituted, the substituent can be any organic group or moiety, so long as it is a substituent not detrimental to the cationic ring-opening living polymerization of oxazolines according to the present invention. Examples of the substituent include halogen atom (preferably fluorine, chlorine or bromine), lower alkoxy, ethylenically unsaturated group-containing group and acetylenically unsaturated group-containing group (or alkynyl). While not limited thereto, preferred substituents are those represented by the formula:

wherein $R^1$ and $R^2$ each independently stands for $C_{1-10}$ alkoxy, aryloxy or aryl-$C_{1-3}$ alkyloxy; or $R^1$ and $R^2$ may together stand for optionally $C_{1-5}$ alkyl-substituted ethylenedioxy (—O—CH(R')—CH$_2$—O—, where R' is hydrogen or $C_{1-5}$ alkyl). Another preferred group of substituents are alkynyl represented by the formula:

wherein $R^3$ stands for hydrogen or $C_{1-5}$ alkyl.

Such a substituent can be at a position as remote as possible from the binding site of the alkyl group to the recurring units, i.e., referring to the formula (A), preferably substitutes the hydrogen atom at the α-terminal. Such a substituent corresponds to an acetal residue and can be easily converted to highly functional formyl or aldehyde group (—CHO) by hydrolysis under mild conditions, and hence is preferred also for this reason. On the other hand, alkynyl group is a simple terminal functional group capable of binding plural compounds with ease and high efficiency, and is preferred for introduction of target-directive ligand or application to click chemistry such as of bioconjugates, as it can selectively form triazole bond without side reaction at the desired site, once various azide group-containing compounds (e.g., folic acid, peptide (such as RGD peptide), enzyme, biocompatible high polymer such as poly(ethylene glycol), polyamino acid and the like) are synthesized. Recently various chemical modifications on surface of enzymes or virus or development of dendrimers using click chemistry are reported, and application of the technology for developing artificial functional protein also is expected.

The residue derived from the nucleophilic agent, which specifies NP in the formula (A), can be introduced by direct reaction with a living polymer which can be a precursor of the random copolymer represented by the formula (A), or it may be a group or moiety which can be introduced through further reaction via the once introduced residue. Although not limited thereto, examples of such a residue include —OH, —SH, —NH$_2$, —CN, —COOH, —OCOC(CH$_3$)═CH$_2$, —OCOCH═CH$_2$, —OCH$_2$CH═CH$_2$ and —OCH$_2$-Ph-CH═CH$_2$. Therefore, as preferred nucleophilic agent, anionoid reagents which produce anionoids corresponding to above residues can be named.

In the formula (A), m and n respectively are the numbers of recurring units derived from 2-ethyl-2-oxazoline and those derived from 2-isopropyl-2-oxazoline, which constitute the random copolymer, and stand for an integer of 5-10,000, independently of each other. From the viewpoint of indicating distinct LCST, m+n is preferably 10-200, but for general utility of POx, these integers can be much greater. The ratio between m and n in the random copolymer can range, as m:n, 1:99-99:1. Whereas for exhibiting the characteristics of the copolymers more distinctly, m:n is preferably within the range of 10:90-90:10, in particular, 20:80-80:20.

A molecular assembly formed of the copolymer of the present invention as specified in the foregoing is preferably monodispersible, but is not thereby limited.

The molecular assembly formed of the copolymer as referred to in this invention normally means an assembly of the copolymer molecules contained in the product resulting from the copolymerization reaction, and one prepared from the reaction product by, e.g., specific molecular weight fractionation, is not intended. Strictly speaking, monodispersibility means that the degree of dispersion (Mw/Mn) is 1, but in the present invention the term signifies a property of copolymers whose degree of dispersion is not more than 1.2, preferably not more than 1.15 and which have narrow molecular weight distribution and can be substantially monodispersed. Furthermore, when desired, the invention can provide copolymers the cloud point of whose 1 wt % aqueous solution is controlled to a value within a range of about 37° C.-67° C., or molecular assemblies of such copolymers.

Thus, the copolymers or molecular assemblies formed of the copolymers that are provided by the present invention not only possess temperature-responsiveness but also exhibit characteristic properties such as monodispersibility, and are useful particularly as medical materials for which qualitative uniformity is required. Needless to say, they can be also broadly used in the technical fields of surface chemistry and biomaterials in which known POx in general have been used.

According to the present invention, furthermore, homopolymers represented by the following formula can also be provided:

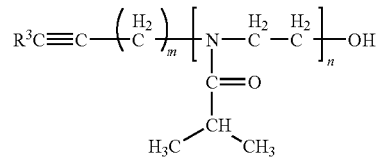

in which $R^3$ stands for hydrogen atom or a $C_{1-5}$ alkyl; m stands for an integer of 1-20, preferably 1-3; and n stands for an integer of 5-10,000, preferably 10-1,000, inter alia, 10-200.

Those copolymers represented by the formula (A) or molecular assemblies formed of the copolymers can be conveniently produced through the cationic ring-opening living polymerization which is provided as another embodiment of the present invention. According to this production method, a monomeric mixture of 2-ethyl-2-oxazoline and 2-isopropyl-2-oxazoline is dissolved in an inert solvent containing cationic polymerization initiator, e.g., aprotic polar solvent solution such as acetonitrile, nitromethane or the like, and the polymerization reaction is carried out at 30° C.-50° C. Depending on the desired temperature-responsiveness of the product copolymer, the molar ratio of 2-ethyl-2-oxazoline to 2-isopropyl-2-oxazoline in the monomeric mixture can be selected within a range of 1:99-99:1, preferably 10:90-90:10, inter alia, 20:80-80:20. According to the method of the present invention, the polymerization process advances in living polymerization mode and therefore, when the reaction is continued long enough to allow the total amount of these monomers fed for the reaction to react, the numbers of the recurring units derived from the respective monomers in the resulting copolymer approximately correspond to the quantitative ratio of the fed monomers.

The reaction temperature may be lower than 30° C., but at such low temperatures many hours are required until the fed monomers completely react, which cannot be necessarily practical for industrial production. Conversely, at temperatures exceeding 50° C., side reactions tend to take place to give copolymers of broad molecular weight distribution. It is therefore recommendable to select reaction temperature of, more preferably, 35° C.-45° C. The monomeric concentration in the reaction liquid is not critical, so long as the monomers can be dissolved in the solvent, while it can be 15-50 wt %, preferably 30-40 wt %. The reaction liquid is preferably stirred during the reaction. The reaction time preferably is such that allows substantially all the monomers are consumed. Where necessary, the residual amount of the monomeric component in the reaction liquid can be traced by a per se known method of analysis. The reaction time normally is about 200- about 500 hours.

A nucleophilic agent is added to thus obtained reaction liquid to introduce NP in the formula (A) in situ. Alternatively, OH groups as NP are introduced into the living copolymer by treating the copolymer with a nucleophilic agent or anionoid-producing anionoid reagent such as sodium hydroxide, and where necessary, then recovered copolymer may be subjected to a further reaction to convert the OH group to other desired functional group. Thus the copolymers represented by the formula (A) can be produced. The recovery and isolation of the copolymers out can be carried out by the means will known in the art.

The above homopolymers or molecular assemblies formed of the polymers can be produced under the conditions similar to those for producing the copolymers, except that the use of the two kinds of monomers in the copolymer production is changed to the use of 2-isopropyl-2-oxazoline, and, in particular, alkynyl-alkyl tosylate is used as the cationic polymerization initiator.

BRIEF EXPLANATION OF DRAWINGS

FIG. 6-B shows measurement of changes in the cloud point versus the ratio of 2-ethyl-2-oxazoline (EtOx) (25%, 50%, and 75%) in the random copolymers. In the figure, ♦ (150 mM salt concurrently present) and ◇ (no salt) are for iPrOx homopolymer ($PiPrOx_{100\%}$) having hydroxyl group at ω-terminal; ● (150 mM salt concurrently present) and ○ (no salt) are for the random copolymer $PEtOx_{25\%}iPrOx_{75\%}$ having hydroxyl group at ω-terminal; ▲ (150 mM salt concurrently present) and Δ (no salt) are for the random copolymer $PEtOX_{50\%}iPrOx_{50\%}$ having hydroxyl group at ω-terminal; and ■ (150 mM salt concurrently present) and □ (no salt) are for the random copolymer $PEtOx_{75\%}iPrOx_{25\%}$ having hydroxyl group at ω-terminal.

BEST MODE FOR PRACTICING THE INVENTION

Figure 1:
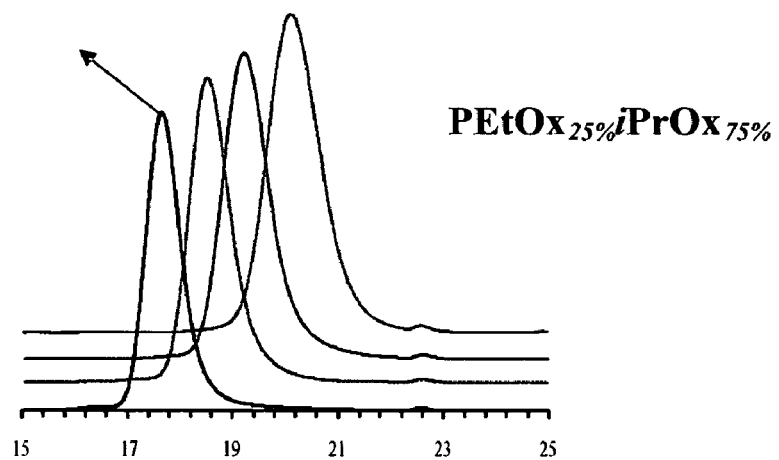
FIG. 1 shows GPC diagrams of three kinds of the random copolymers ($PEtOx_{25\%}iPrOx_{75\%}$, $PEtOx_{50\%}iPrOx_{50\%}$, and $PEtOx_{75\%}iPrOx_{25\%}$) having hydroxyl group at ω-terminal, as obtained in Production Examples 1-3 (this invention). In the figure, A shows $PEtOX_{25\%}iPOx_{75\%}$ after 310 hours of the reaction (polymerization completed); B shows $PEtOx_{50\%}iPrOx_{50\%}$ after 407 hours of the reaction (polymerization completed); and C shows $PEtOx_{75\%}iPrOx_{25\%}$ after 288 hours of the reaction (polymerization completed).
Figure 1:
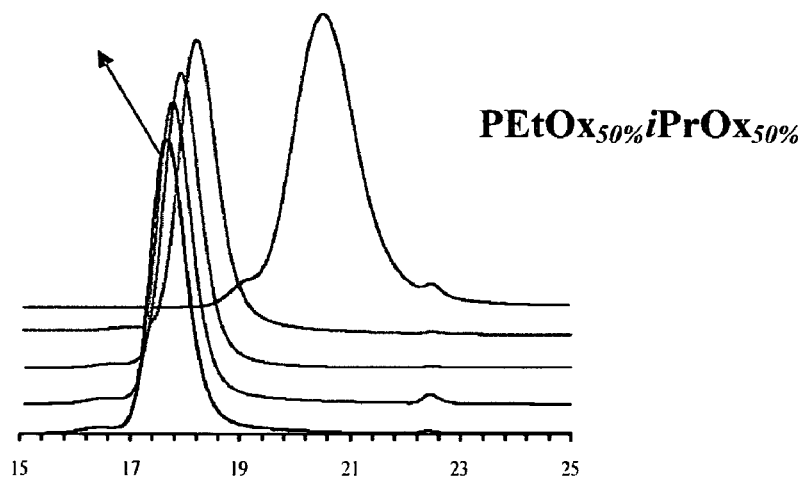
Figure 1:
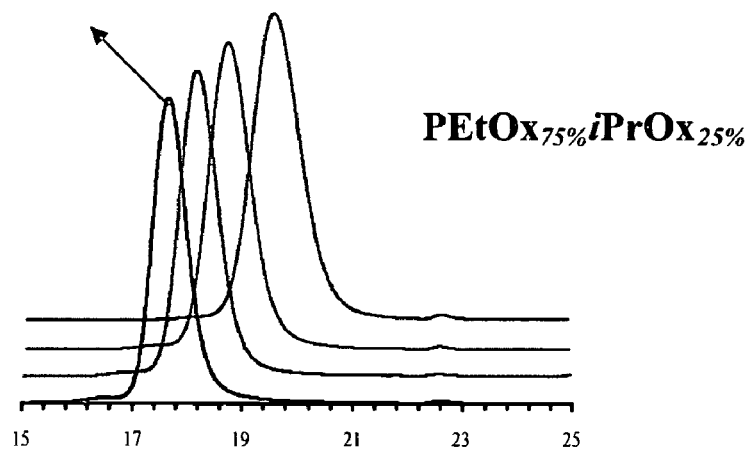

Hereinafter the invention is more specifically explained, referring to working Examples.

Referential Production Example 1

Cationic ring-opening polymerization of 2-isopropyl-2-oxazoline (iPrOx) and synthesis of poly(2-isopropyl-2-oxazoline) (PiPrOx) homopolymer therefrom

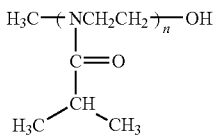

In an atmosphere of dry argon, 0.186 g (1 mmol) of methyl tosylate as the initiator and 10 g (88.4 mmols) of an iPrOx monomer were added to 30 mL of acetonitrile solvent, to effect its cationic ring-opening polymerization (theoretical molecular weight=10,000 and the theoretical degree of polymerization=[iPrOx]/[methyl tosylate]=88.4). The reaction was carried out for about 506 hours, at the optimum reaction temperature of 42° C. in a thermostat, and then the reaction system was cooled to room temperature. For introducing hydroxyl group at termination terminal of the polymer, 10 mL of 1M NaOH-methanol mixed solvent was added, followed by 30 minutes' termination reaction. The reaction mixture was purified by dialysis against water, and dried under reduced pressure to provide about 9 g (yield, 90%) of the polymer. The molecular weight (Mn=9700) of the finally obtained polymer well coincided with that of the feed, and the molecular weight distribution of the polymer (Mw/Mn=1.02) was very narrow. Construction of the polymer was analyzed with $^1$H-NMR spectrum, and by terminal analysis using MALDI-TOF-MS spectrum, the polymer was confirmed to have a structure as shown by the above formula.

Referential Production Example 2

Cationic ring-opening polymerization of 2-ethyl-2-oxazoline (EtOx) and synthesis of poly(2-ethyl-2-oxazoline) (PEtOx) homopolymer therefrom

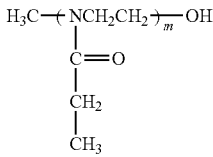

In an atmosphere of dry argon, 0.186 g (1 mmol) of methyl tosylate as the initiator and 8.92 mL (88.4 mmols) of EtOx monomer were added to 30 mL of acetonitrile solvent to effect its cationic ring-opening polymerization (theoretical molecular weight=8,800, the theoretical degree of polymerization=[EtOx]/[methyl tosylate]=88.4). The reaction was carried out for about 315 hours, at the optimum reaction temperature of 42° C. in a thermostat, and then the reaction system was cooled to room temperature. For introducing hydroxyl group at termination terminal of the polymer, 10 mL of 1M NaOH-methanol mixed solvent was added, followed by 30 minutes' termination reaction. The reaction mixture was purified by dialysis against water, and dried under reduced pressure to provide about 8.3 g (yield, 95%) of the polymer. The molecular weight (Mn=8300) of the finally obtained polymer well coincided with that of the feed, and the molecular weight distribution of the polymer (Mw/Mn=1.01) was very narrow. Construction of the polymer was analyzed with $^1$H-NMR spectrum, and by terminal analysis using MALDI-TOF-MS spectrum, it was confirmed that hydroxyl group was quantitatively introduced at the termination terminal and that a polymer of the above structural formula was obtained.

Referential Production Example 3

Cationic ring-opening polymerization of 2-isopropyl-2-oxazoline (iPrOx) initiated by 3,3-diethoxy-1-propyl tosylate (AceOTs) and synthesis of poly(2-isopropyl-2-oxazoline having α-acetal and ω-ahydroxyl groups (Acetal-PiPrOx-OH) homopolymer In an atmosphere of dry argon, 0.3 g (1 mmol) of methyl tosylate as an initiator and 9.74 g (86 mmols) of iPrOx monomer were added to 30 mL of acetonitrile solvent, to effect its cationic ring-opening polymerization (theoretical molecular weight=10,000, the theoretical degree of polymerization=[iPrOx]/[methyl tosylate]=86). The reaction was carried out for about 240 hours, at the optimum reaction temperature of 45° C. in a thermostat and then the reaction system was cooled to room temperature. For introducing hydroxyl group at termination terminal of the polymer, 20 mL of 1M NaOH-methanol mixed solvent was added, followed by 30 minutes' termination reaction. The product was purified by dialysis against water and dried under reduced pressure. About 8 g (yield, 80%) of the polymer was recovered. The molecular weight (Mn=9600) of the finally obtained polymer well coincided with that of the feed, and the molecular weight distribution of the polymer (Mw/Mn=1.15) was very narrow. Construction of the polymer was analyzed with $^1$H-NMR spectrum, and by terminal analysis using MALDI-TOF-MS spectrum, it was confirmed that hydroxyl group was quantitatively introduced at the termination terminal.

Production Examples 1-3 (the present invention)

Cationic ring-opening polymerization of monomeric mixture of iPrOx and EtOx and synthesis of three kinds of random copolymers (PiPrOx-ran-PEtOx)

Figure 2:
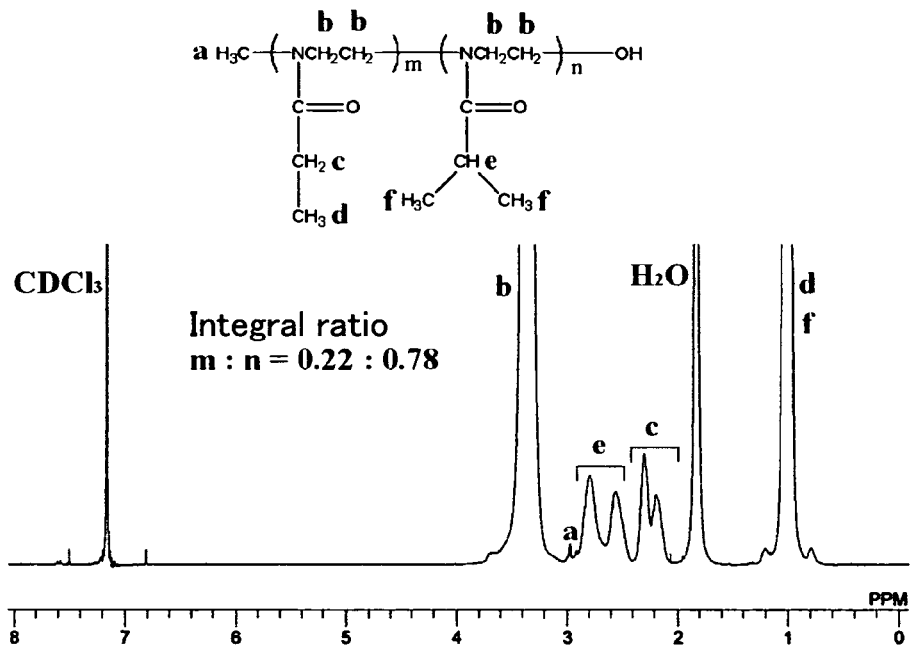
FIG. 2 shows $^1$H-NMR ($CDCl_3$, 400 MHz) spectrum of the random copolymer $PEtOx_{25\%}iPrOx_{75\%}$ having hydroxyl group at ω-terminal, as obtained in Production Example 1 (this invention)
Figure 3:
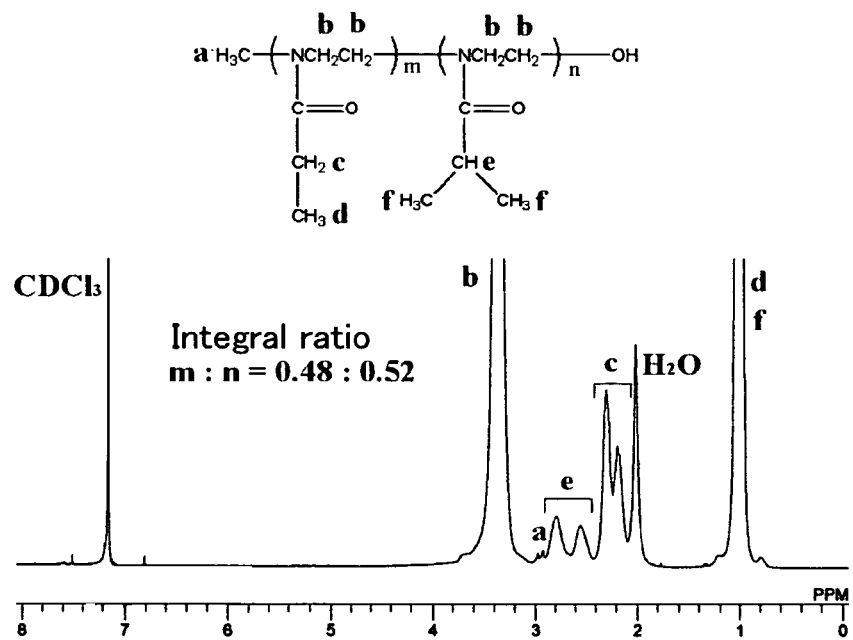
FIG. 3 shows $^1$H-NMR ($CDCl_3$, 400 MHz) spectrum of the random copolymer $PEtOx_{50\%}iPrOx_{50\%}$ having hydroxyl group at ω-terminal, as obtained in Production Example 2 (this invention)
Figure 4:
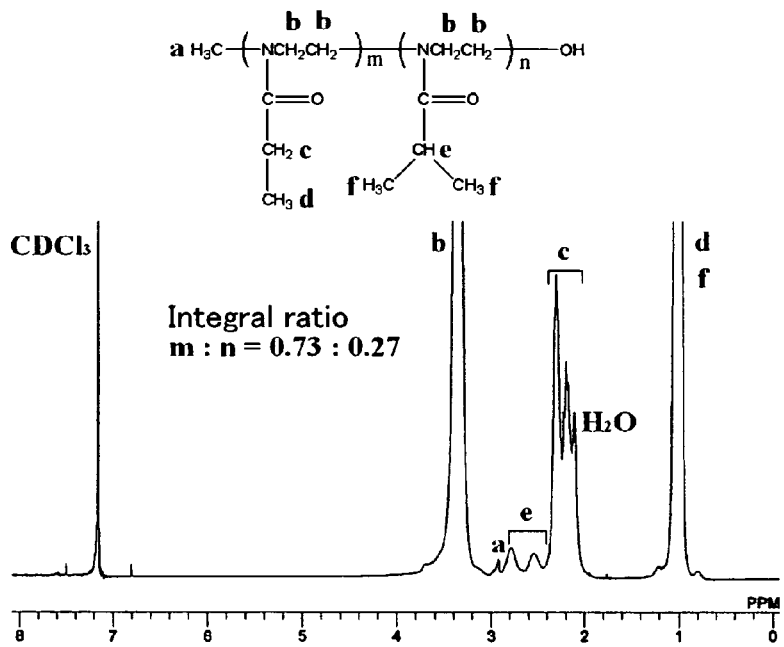
FIG. 4 shows $^1$H-NMR ($CDCl_3$, 400 MHz) spectrum of the random copolymer $PEtOx_{75\%}iPrOx_{25\%}$ having hydroxyl group at ω-terminal, as obtained in Production Example 3 (this invention)
Figure 5:
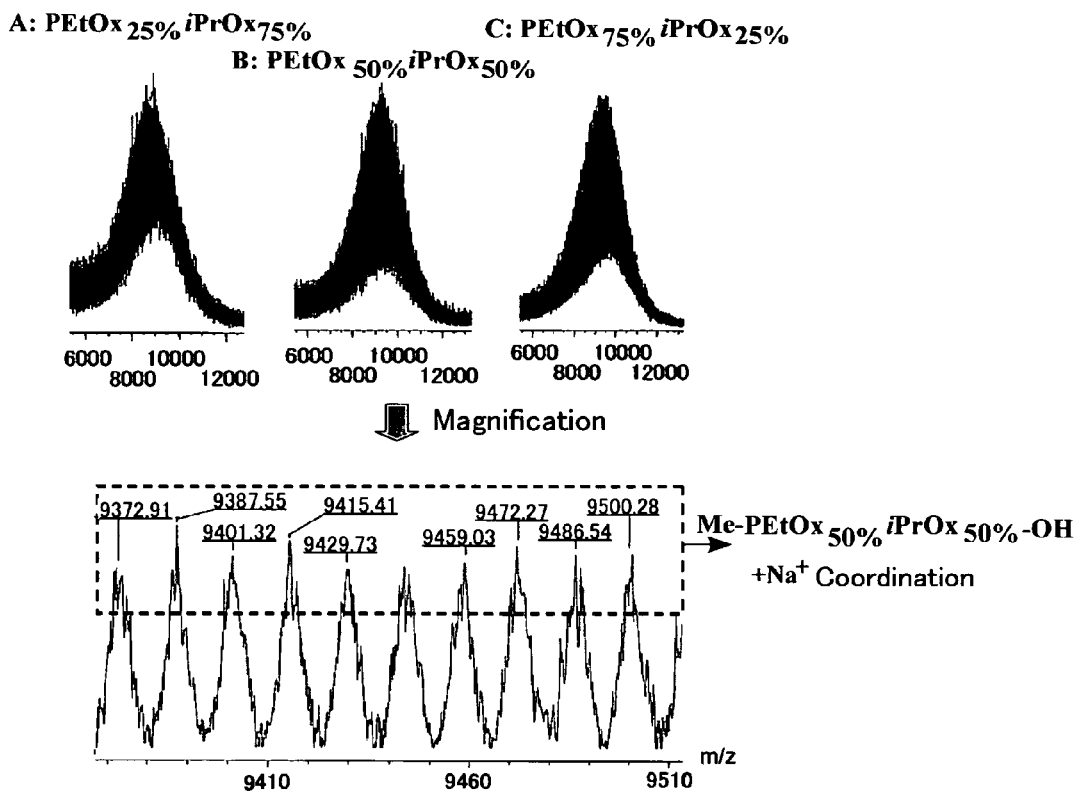
FIG. 5 shows MALDI-TOF-MS spectra of three kinds of random copolymers having hydroxyl group at ω-terminal, as obtained in Production Examples 1-3 (this invention). In the same figure, A shows the spectrum of $PEtOx_{25\%}iPrOx_{75\%}$, B shows that of $PEtOx_{50\%}iPrOx_{50\%}$ and C, that of $PEtOx_{75\%}iPrOx_{25\%}$.

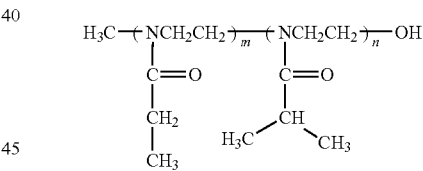

iPrOx (monomer) and EtOx (hydrophilic comonomer) were mixed at various ratios (EtOx$_A$:iPrOx$_A$=25%:75%, EtOx$_B$:iPrOx$_B$=50%:50%, EtOx$_C$:iPrOx$_C$=75%:25%), and each of the mixtures was subjected to precision random ionic copolymerization. In dry argon atmosphere, 0.15 mL (1 mmol) of methyl tosylate as the initiator and each of the monomeric mixtures (EtOx$_A$+iPrOx$_A$=2.19 g+7.502 g=9.692 g, EtOx$_B$+iPrOx$_B$=4.3815 g+5 g=9.3815 g, EtOx$_C$+iPrOx$_C$=6.57 g+2.5 g=9.07 g) were added to 30 mL of acetonitrile solvent to carry out cationic ring-opening polymerization (the theoretical degree of polymerization$_{m+n}$= [monomeric mixture]$_{A, B, C}$/[methyl tosylate]=88.4). At the optimum reaction temperature of 42° C. in a thermostat, the reaction systems were reacted for, respectively, 310 hours (A), 407 hours (B) and 288 hours (C) and thereafter cooled to room temperature. For introducing hydroxyl group at each polymer's termination terminal, 10 mL of 1M NaOH-methanol mixed solution was added to cause 30 minutes' termination reaction. The reaction products were purified by dialysis against water and dried under reduced pressure. Whereupon the polymers (PEtOx$_A$iPrOx$_A$: about 8.4 g (yield, 87%), PEtOx$_B$iPrOx$_B$: about 8.5 g (yield, 91%), PEtOx$_C$iPrOx$_C$: about 7.7 g (yield, 85%) were recovered. It was confirmed on the GPC diagrams (FIG. 1) that the molecular weight of the polymers versus polymerization time changed with time. The degree of polymerization (m+n) (PEtOx$_A$iPrOx$_A$: 81.8, PEtOx$_B$iPrOx$_B$: 88, PEtOx$_C$iPrOx$_C$: 85.9) of the ultimately obtained polymers were coincided with the fed amounts, and the polymers' molecular weight distribution values (Mw/Mn) (PEtOx$_A$iPrOx$_A$: 1.00, PEtOx$_B$iPrOx$_B$: 1.01, PEtOx$_C$iPrOx$_C$: 1.01) were invariably very narrow. For the structural analysis of the polymers, their $^1$H-NMR spectra were used (cf. FIGS. 2, 3 and 4). Also by the terminal analyses with MALDI-TOF-MS spectra, it was confirmed that each of the polymers was copolymerized at random (cf. FIG. 5).

Production Example 4 (the present invention)

Synthesis of poly(2-propargylisopropyl-2-oxazoline (propargyl-PiPrOx-OH) homopolymer having propargyl group at the initiation terminal and hydroxyl group at the termination terminal

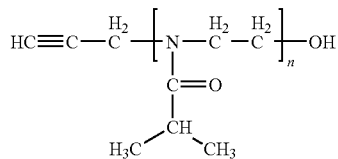

Figure 7:
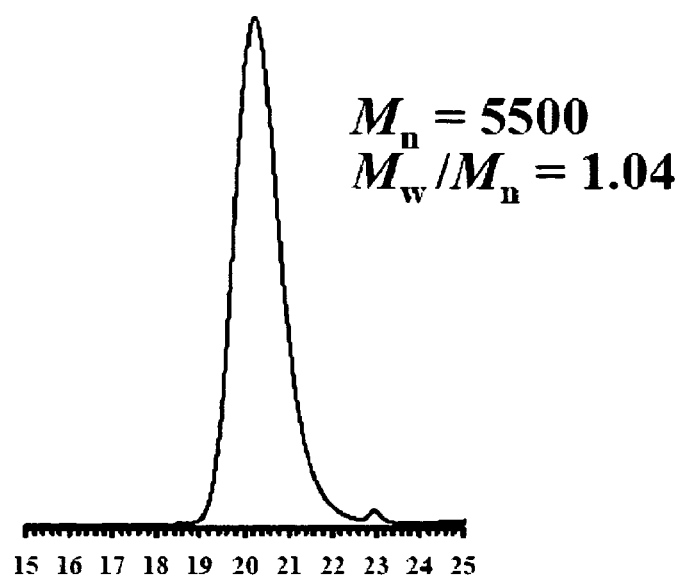
FIG. 7 shows GPC diagram of the propargyl-PiPrOx-OH as obtained in Production Example 4 (this invention).
Figure 8:
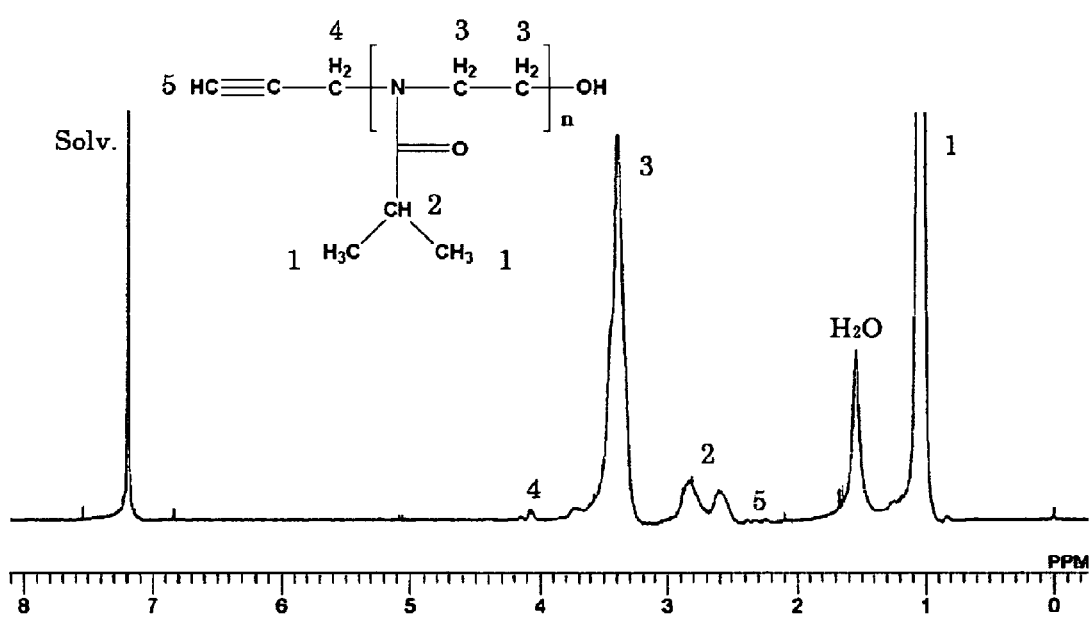
FIG. 8 shows $^1$H-NMR spectrum ($CDCl_3$, 400 MHz) of the propargyl-PiPrOx-OH as obtained in Production Example 4 (this invention).
Figure 9:
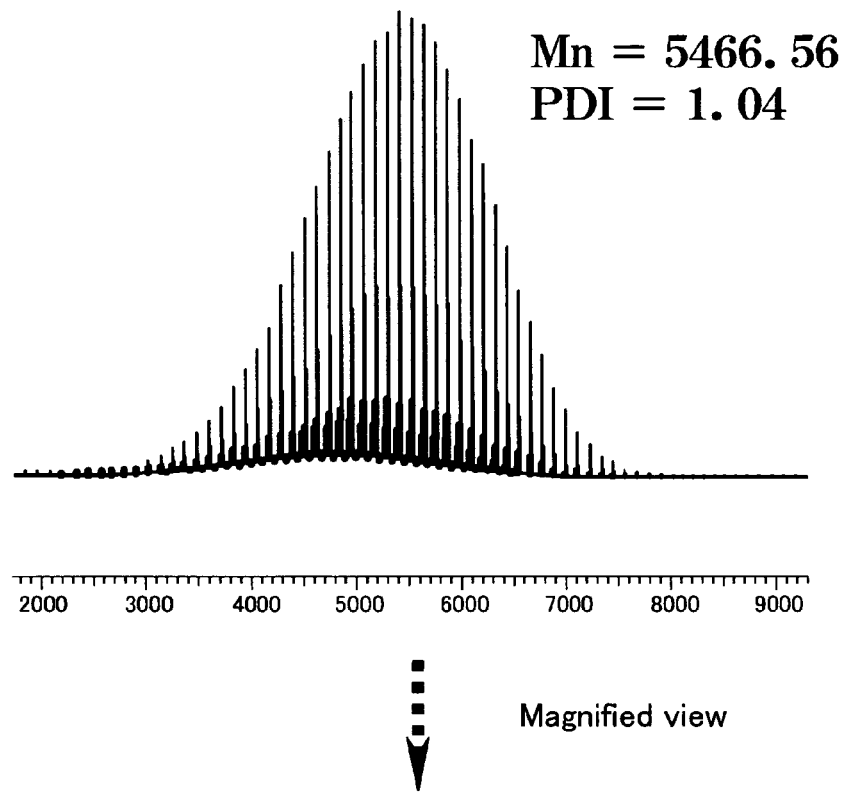
FIG. 9 shows MALDI-TOF-MS spectrum of the Propargyl-PiPrOx-OH as obtained in Production Example 4 (this invention).
Figure 9:
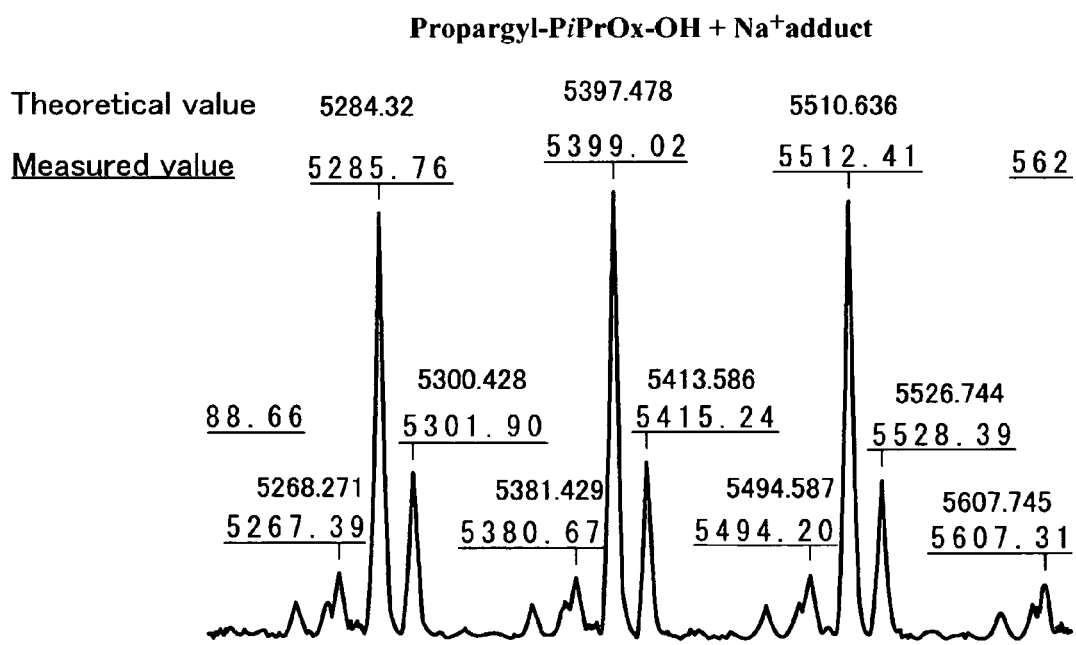

In an atmosphere of dry argon, 0.0486 g (0.231 mmol) of propargyl tosylate (initiator) and 1.25 g (11 mmols) of 2-isopropyl-2-oxazoline (monomer) were added to 5 mL of acetonitrile solvent and the cationic ring-opening polymerization was carried out (theoretical molecular weight=5400, the theoretical degree of polymerization=[iPrOx]/[methyl tosylate]=47.6). The reaction was continued for about 227 hours at the optimum reaction temperature of 42° C. in a thermostat, and then the reaction system was cooled to room temperature. For introducing hydroxyl group at the termination terminal of the polymer, 5 mL of 1M NaOH-methanol mixed solvent was added, followed by 30 minutes' termination reaction. The reaction mixture was purified by dialysis against water, and dried under reduced pressure to provide about 1.13 g (yield, 90%) of the polymer. The molecular weight (Mn=5500) of the ultimately obtained polymer well coincided with the theoretical value, and the molecular weight distribution (Mw/Mn=1.04) was confirmed to be very narrow, on the GPC diagram (FIG. 7). For structural analysis of the polymer, $^1$H-NMR spectrum was used (FIG. 8). Also by the terminal analysis using MALDI-TOF-MS spectrum, it could be confirmed that both propargyl group at the initiating terminal and the hydroxyl group at the termination terminal were quantitatively introduced (FIG. 9).

Test Example 1

Figure 6:
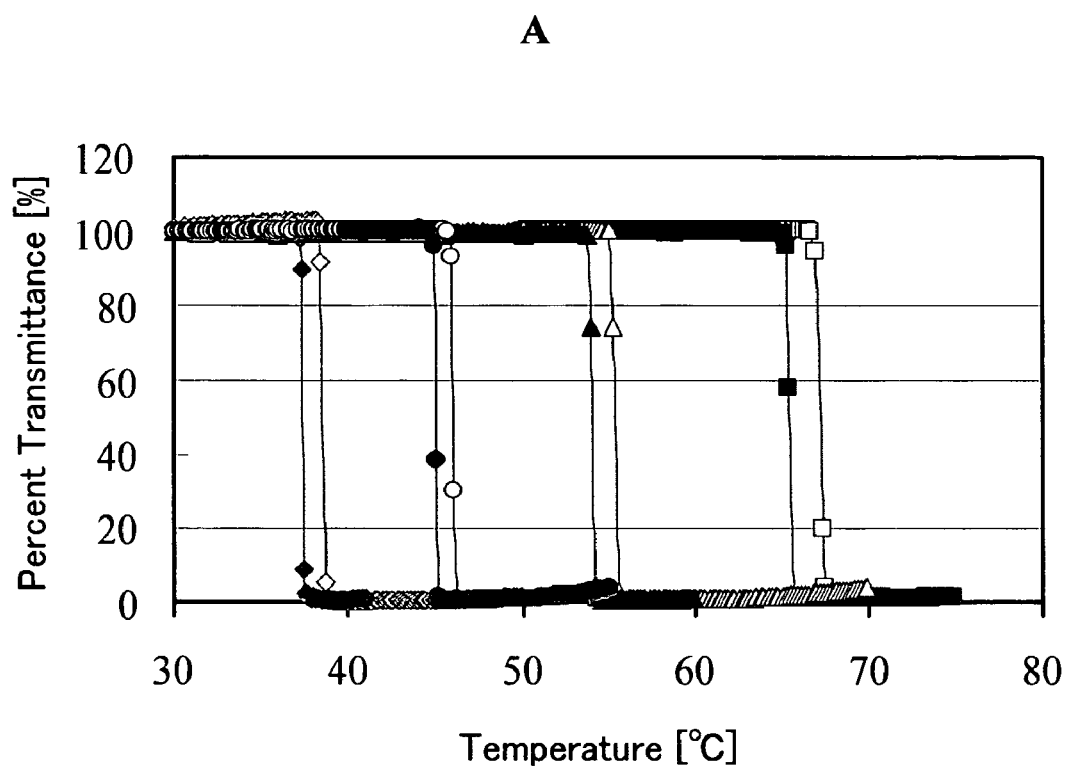
FIG. 6-A shows measurement of the temperature at which percent transmission drops (cloud point, Tcp) at the polymer concentration of 1 wt % (10 mg/mL) and temperature rise rate of 0.5 deg/min.
Figure 6:
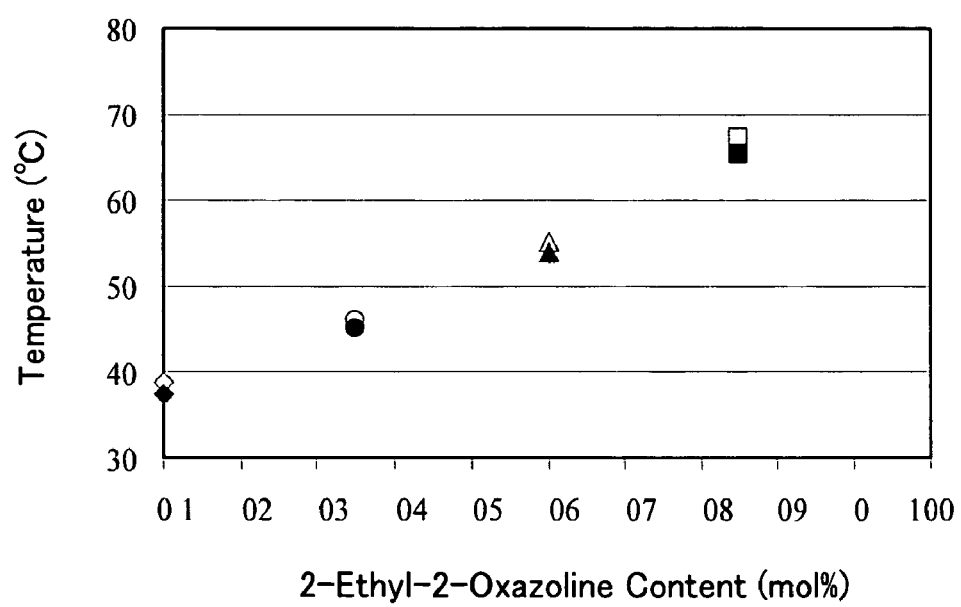

Measurement of % transmittance accompanying turbidity change and determination of cloud point (Cloud Point Temperature; Tcp) of the polymers therefrom Using the polymers produced in Production Examples 1-3 (the present invention), cloud points of the polymers in water due to temperature change were measured and evaluated. Cloud points of the homopolymer of iPrOx (PiPrOx$_{100\%}$) and of the three kinds of the random copolymers (PEtOx$_{25\%}$iPrOx$_{75\%}$, PEtOx$_{50\%}$iPrOx$_{50\%}$, and PEtOx$_{75\%}$iPrOx$_{25\%}$) as synthesized were measured respectively [FIGS. 6-(A), (B)]. In consequence, it could be confirmed that accurate control of cloud point of temperature-responsive PiPrOx accompanying the variation in the blend ratio between iPrOx and EtOx was accomplished over a wide temperature range (from about 37° C. to 67° C.).

INDUSTRIAL APPLICABILITY

According to the invention, polymers whose temperature-responsiveness is controlled so as to show distinct cloud point or lower critical solution temperature (LCST) at a certain temperature within a broad range can be provided, which can be used by industries making or using useful materials in the art of surface chemistry and biomaterials.

The invention claimed is:

1. A production method of a homopolymer represented by the following formula:

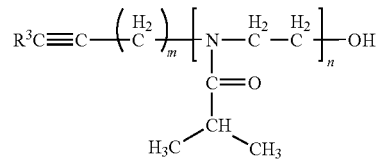

wherein R$^3$ stands for hydrogen or C$_{1-5}$ alkyl, m stands for an integer of 1-20, and n stands for an integer of 5-10,000, which comprises a step of ring-opening polymerizing with 2-isopropyl-2-oxazoline in an inert solvent at 30° C.-50° C. in the presence of a cationic polymerization initiator, a step of reacting the resultant homopolymer with a nucleophilic agent, and, where necessary, a step of isolating the formed homopolymer.

2. The production method according to claim 1, in which the cationic polymerization initiator is a substituted or unsubstituted, straight chain or branched C$_{1-20}$ alkyl tosylate.

3. The production method according to claim 2, in which the substituent on the substituted straight chain or branched C$_{1-20}$ alkyl is represented by a formula,

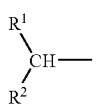

or a formula,

wherein $R^1$ and $R^2$ either stand for $C_{1-10}$ alkoxy, aryloxy or aryl-$C_{1-3}$ alkyloxy, independently of each other, or $R^1$ and $R^2$ together stand for optionally $C_{1-5}$ alkyl-substituted ethylenedioxy (—O—CH(R')—CH$_2$—O—, R' being hydrogen or $C_{1-5}$ alkyl) or oxy (=O) group, and $R^3$ stands for hydrogen or $C_{1-5}$ alkyl.

4. A homopolymer represented by the following formula

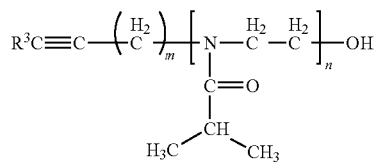

in the formula, $R^3$ stands for hydrogen or $C_{1-5}$ alkyl, m stands for an integer of 1-20, and n stands for an integer of 5-10,000.

* * * * *